United States Patent [19]

Turner et al.

[11] Patent Number: 5,141,568

[45] Date of Patent: Aug. 25, 1992

[54] WATER-SOLUBLE SOLDERING PASTE

[75] Inventors: Raymond L. Turner, La Habra; Kirk E. Johnson, Diamond Bar; Larry L. Kimmel, Garden Grove, all of Calif.

[73] Assignee: Hughes Aircraft Company, Los Angeles, Calif.

[21] Appl. No.: 608,041

[22] Filed: Oct. 31, 1990

Related U.S. Application Data

[63] Continuation-in-part of Ser. No. 523,765, May 15, 1990, Pat. No. 5,085,365.

[51] Int. Cl.$^5$ .............................................. B23K 35/34
[52] U.S. Cl. ........................................ 148/24; 148/25; 228/223
[58] Field of Search ...................... 148/24, 25; 228/223

[56] References Cited

U.S. PATENT DOCUMENTS

| | | | |
|---|---|---|---|
| 1,402,644 | 1/1922 | Passalacqua | 148/25 |
| 3,305,406 | 2/1967 | Chmelick et al. | 148/23 |
| 3,684,533 | 8/1972 | Conwicke | 148/24 |
| 3,925,112 | 12/1975 | Petersen | 148/25 |
| 4,113,525 | 9/1978 | Slayner | 148/23 |
| 4,290,824 | 9/1981 | Cole | 148/23 |
| 4,342,606 | 8/1982 | Notton | 148/23 |
| 4,342,607 | 8/1982 | Zado | 148/23 |
| 4,478,650 | 10/1984 | Zado | 148/23 |
| 4,738,732 | 4/1988 | Anderson et al. | 148/23 |
| 4,759,490 | 7/1988 | Ochiai | 148/24 |
| 4,872,928 | 10/1989 | Jacobs | 148/24 |

FOREIGN PATENT DOCUMENTS

| | | |
|---|---|---|
| 104106 | 3/1922 | France. |
| 460965 | 4/1975 | U.S.S.R. . |

OTHER PUBLICATIONS

Anderson, et al., filed Apr. 11, 1989, "Method And Composition For Protecting And Enhancing The Solderability Of Metallic Surfaces"Serial Number: 07/336,178.

*Primary Examiner*—Peter D. Rosenberg
*Attorney, Agent, or Firm*—Wanda K. Denson-Low

[57] ABSTRACT

A non-toxic, non-corrosive water-soluble soldering paste comprises at least about 80 wt % of particulate solder and the balance a thixotropic flux base. The flux base has a viscosity of at least about 200,000 cp and comprises (a) a botanical oil, (b) an aqueous emulsion of a thickening agent, such as corn starch or an ethoxylated linear alcohol in water, and (c) an organic acid having at least two carboxylic acid groups, such as citric acid. The paste of the invention produces solder joints of high metallic luster and excellent quality. Clean-up of paste residues is ac complished using only water.

39 Claims, No Drawings

WATER-SOLUBLE SOLDERING PASTE

CROSS-REFERENCE TO RELATED APPLICATIONS

The present application is a continuation-in-part application of Ser. No. 07/523,765, filed 5/15/90 now U.S. Pat. No. 5,085,365 filed in the name of Ray L. Turner and assigned to the same assignee as the present application. The applications disclose and claim a method of soldering using a water-soluble flux which contains a water-soluble organic acid having at least two carboxylic acid groups. A preferred example of such an organic acid is citric acid.

The present application is also related to Ser. No. 07/607,199, filed the same date as the present application and assigned to the same assignee as the present application. That application discloses and claims a composition of matter useful as a liquid flux in cored solders.

TECHNICAL FIELD

The present invention relates to a novel soldering paste which contains an environmentally-safe flux used in surface mount component soldering processes.

BACKGROUND ART

Most fluxes and defluxing chemicals used by industry to manufacture electronic circuits, such as military hardware, are either contributing to ozone depletion of the atmosphere or are considered by local environmental agencies, such as the Air Quality Management District in the Los Angeles basin, as environmental pollutants or health hazards. For example, it has been reported that if CFCs (chlorofluorohydrocarbons), which are used in vapor degreasing to clean soldered parts where a rosin flux is employed, are released to the atmosphere, they will remain there as an ozone depletant for nearly 100 years. Other chemicals such as rosin fluxes, alcohols, and the like pose health risks and disposal problems for industry.

Water-soluble fluxes could be the simple solution for this major problem. However, most water-soluble fluxes are formulated with harsh activators, such as hydrochloric acid and complex glycols, which create major cleaning and residue problems for the printed circuit board and the electrical circuitry thereon and which tend to severely corrode the metal being soldered or contaminate the dielectric, causing a tendency for electromigration. Other water-soluble fluxes are formulated with iso-propanol and/or plasticizers, which create disposal and health problems.

Water-soluble solder pastes are formulations that combine a soldering alloy, typically in powder form, with a water-soluble organic activator and a water-soluble organic vehicle; see, e.g., U.S. Pat. No. 4,872,928. While citric acid is mentioned as an example of an organic acid that acts as an activator, the paste also includes other materials that are not environmentally desirable, such as polyethylene glycol.

What is desired is a simple, non-toxic, non-corrosive, environmentally-safe liquid soldering paste that produces solder joints of high metallic luster and excellent quality.

DISCLOSURE OF INVENTION

In accordance with the invention, a novel soldering paste is provided, comprising particulate solder alloy and a thixotropic flux base. The thixotropic flux base, itself also novel, comprises (a) a botanical oil, (b) a thickening agent, and (c) a water-soluble organic acid having at least two carboxylic acid groups.

The paste of the invention eliminates harmful environmental emissions normally associated with rosin-based fluxes, flux thinner (such as iso-propanol), and associated defluxing solvents (such as CFCs). The paste of the invention is environmentally safe, non-toxic, and easy to use. Soldering time and defluxing (cleaning) time are both reduced significantly over those corresponding times required for rosin-based fluxes, for example. Soldered assemblies can be cleaned in deionized water, thus eliminating the high capital costs associated with vapor degreasing equipment. The resulting soldered joint exhibits high metallic luster and excellent electrical quality.

BEST MODES FOR CARRYING OUT THE INVENTION

The soldering paste of the invention comprises particulate solder alloy and a thixotropic flux base. The thixotropic flux base comprises (a) a botanical oil, (b) an aqueous emulsion of a thickening agent, and (c) a water-soluble organic acid having at least two carboxylic acid groups. Examples of suitable organic acids include citric acid, malic acid, tartaric acid, glutamic acid, phthalic acid, succinic acid, and the like.

However, the best results have been obtained with citric acid, and while the class of organic acids indicated above is useful, the remainder of the description which follows is directed to the use of citric acid as a flux in solder pastes used in soldering components.

Without subscribing to any particular theory, it appears that the citric acid chelates the oxide on the basis metal being soldered, but not the metal itself. As a result, there is little or no corrosion of the basis metal by the flux of the invention. Thus, to the extent that members of the above class of organic acids behaves similarly to citric acid, then such members are also included within the ambit of the invention.

The particulate solder may comprise solder balls having a mesh size and composition typically employed in solder pastes. As an example, the solder balls may range from −325 to +400 mesh and preferably from -200 to +325 mesh, although larger mesh sizes may also be employed. Typically, the concentration of the particulate solder in the paste is about 80 to 90 wt%, the balance being the flux base.

The particulate solder may comprise any of the commonly employed soldering alloys, including 60/40 Sn/Pb, 62/2/36 Sn/Ag/Pb, 63/37 Sn/Pb, and 96/4 Sn/Ag. Typically, 60/40 and 63/37 solders are used.

As indicated above, the thixotropic base comprises (a) botanical oil, (b) thickening agent in water, and (c) the water-soluble organic acid. The thixotropic flux base may be combined with the particulate solder to form the solder paste of the invention. Alternatively, the thixotropic flux base may be formulated separately as a paste for use in soldering operations.

The thickening agent may comprise any of the thickeners commonly used in food processing, such as corn starch, potato starch, lichen, arrowroot powder, and the like. Ethoxylated linear alcohols may also serve as a thickener in the practice of the invention. The minimum viscosity of the flux base after adding the thickening agent must be at least 200,000 centipoise (cp) at room temperature for use in the practice of the invention. For corn starch, this requires a minimum of 170 g/l concentration in water. When an ethoxylated linear alcohol is used, a ratio of at least 1:1 of alcohol to water is used.

Deionized water is advantageously employed in the practice of the invention, although for extremely sensitive electronic circuits, distilled water may be used.

The botanical oil serves to level the solder, minimize splattering during the soldering process, and prevent drying of the paste. Examples of suitable botanical oils include jojoba oil, palm oil, and peanut oil. A relatively small amount of oil is required, as shown below for the preferred composition. Animal fat oils do not clean up easily, and are to be avoided in the practice of the invention.

The concentration range of citric acid in the flux base must be sufficient to activate the board solder (it is not necessary to activate the particulate solder in the paste). The minimum concentration of citric acid accordingly must be at least about 3 wt% and can range up to saturation of the flux base. If necessary, a non-toxic medium which ties up free water may be used with lower concentrations of citric acid.

The organic acid may be used in crystal or powder form. For extremely sensitive electrical circuits, it may be desirable to employ a fairly high grade of citric acid.

The flux may contain other components, such as impurities, whether accidental or deliberate, so long as such additives have no adverse effect on the soldering results.

An odorant may optionally be added. Examples of such an odorant, which is intended to be a pleasant aroma for the user, include wintergreen oil, spearmint oil, and peppermint oil. The concentration of the odorant is about 1 to 30 ppm.

An especially preferred composition consists essentially of the following:
about 80 to 90 wt% particulate solder (−200 to +325 mesh); and
the balance the thixotropic flux base, consisting essentially of:
(1) about 1 to 5 wt% botanical oil;
(2) about 47.5 to 49.5 wt% thickening agent, such as 170 g/l of corn starch in water or 1:1 ethoxylated linear alcohol in water; and
(3) about 47.5 to 49.5 wt% citric acid solution (3% to saturated).

As indicated above, about 1 to 30 ppm odorant, such as wintergreen oil, may be added to the paste for aromatic purposes.

The paste is most advantageously employed in surface mount component soldering processes. The water-soluble solder paste of the invention avoids the use of rosin-based solder pastes, which necessitate the use of chlorofluorocarbon-type defluxing agents; rather, the paste of the invention is easily defluxed using deionized water.

The paste of the invention provides the following advantages:

1. It eliminates harmful environmental emissions normally associated with rosin-based fluxes, flux thinner (such as iso-propyl alcohol), and associated defluxing agents (such as 1,1,1-trichloroethane). Indeed, cleaning of the paste is simply done in warm or hot water. Thus, the new paste is environmentally safe.

2. It provides soldering personnel with a non-toxic, extremely safe, and highly effective solder paste to use.

3. Its use cuts the actual soldering time by approximately 50%. This enables soldering to proceed at a considerably higher rate than permitted by rosin-based solders, thereby subjecting electronic components to the heat of the solder for a far shorter period of time.

4. Its use provides solder joints that evidence a more lustrous connection with excellent wetting and an estimated 80% reduction in solder defects, compared with rosin-impregnated solder pastes.

INDUSTRIAL APPLICABILITY

The solder paste of the invention is expected to find use in commercial soldering operations, particularly in soldering electrical components in circuit boards.

Thus, there has been disclosed a non-toxic, non-corrosive, environmentally-safe, water-soluble soldering paste, suitable for use in soldering electrical components. It will be clear to those skilled in the art that various changes and modifications of an obvious nature may be made, and all such changes and modifications are considered to fall within the scope of the invention, as defined by the appended claims.

What is claimed is:

1. A water-soluble solder paste comprising:
   (a) at least about 80 wt% particulate solder; and
   (b) the balance a thixotropic flux base having a viscosity of at least about 200,000 cp and comprising
   (1) a botanical oil,
   (2) an aqueous emulsion of a thickening agent, and
   (3) a water-soluble organic acid having at least two carboxylic acid groups, said organic acid selected from the group consisting of citric acid, malic acid, tartaric acid, glutamic acid, phthalic acid, and succinic acid.

2. The paste composition of claim 1 wherein said particulate solder has a mesh size ranging from about −325 to +400.

3. The paste composition of claim 2 wherein said particulate solder has a mesh size ranging from about −200 to +325.

4. The paste composition of claim 1 wherein said solder consists essentially of a tin-based solder.

5. The paste composition of claim 4 wherein said solder consists essentially of a tin-lead solder.

6. The paste composition of claim 1 wherein said thickening agent consists essentially of at least member selected from the group consisting of at least one food thickener and an ethoxylated linear alcohol.

7. The paste composition of claim 6 wherein said food thickener is selected from the group consisting of corn starch, potato starch, lichen, and arrowroot powder.

8. The paste composition of claim 7 wherein said thickening agent consists essentially of 170 g/l of corn starch in water.

9. The paste composition of claim 6 wherein said thickening agent consists essentially of an ethoxylated linear alcohol in water in a ratio of at least about 1:1.

10. The paste composition of claim 1 wherein said botanical oil comprises at least one oil selected from the group consisting of jojoba oil, palm oil, and peanut oil.

11. The paste composition of claim 1 wherein said organic acid consists essentially of citric acid.

12. The paste composition of claim 1 further including an odorant pleasing to the smell.

13. The paste composition of claim 1 consisting essentially of:
   (a) about 80 to 90 wt% of particulate solder having a mesh size ranging from −200 to +325;

(b) the balance said thixotropic flux base consisting essentially of
   (1) about 1 to 5 wt% botanical oil selected from the group consisting of jojoba oil, palm oil, and peanut oil,
   (2) about 47.5 to 49.5 wt% thickening agent selected from the group consisting of 170 g/l of corn starch in water and 1:1 ethoxylated linear alcohol in water, and
   (3) about 47.5 to 49.5 wt% citric acid solution, ranging in concentration from about 3 wt% to saturation of said flux base.

14. The paste composition of claim 13 further including about 1 to 30 ppm of an odorant selected from the group consisting of wintergreen oil, spearamint oil, and peppermint oil.

15. A paste composition suitable for use in soldering operations, said paste composition having a viscosity of at least about 200,000 cp and comprising
   (a) botanical oil,
   (b) an aqueous emulsion of a thickening agent, and
   (c) a water-soluble organic acid having at least two carboxylic acid groups, said organic acid selected from the group consisting of citric acid, malic acid, tartaric acid, glutamic acid, phthalic acid, and succinic acid.

16. The paste composition of claim 15 wherein said thickening agent consists essentially of at least member selected from the group consisting of at least one food thickener and an ethoxylated linear alcohol.

17. The paste composition of claim 16 wherein said food thickener is selected from the group consisting of corn starch, potato starch, lichen, and arrowroot powder.

18. The paste composition of claim 17 wherein said thickening agent consists essentially of 170 g/l of corn starch in water.

19. The paste composition of claim 16 wherein said thickening agent consists essentially of an ethoxylated linear alcohol in water in a ratio of at least about 1:1.

20. The paste composition of claim 15 wherein said botanical oil comprises at least one oil selected from the group consisting of jojoba oil, palm oil, and peanut oil.

21. The paste composition of claim 15 wherein said organic acid consists essentially of citric acid.

22. The paste composition of claim 15 further including an odorant pleasing to the smell.

23. The paste composition of claim 15 consisting essentially of:
   (a) about 1 to 5 wt% botanical oil selected from the group consisting of jojoba oil, palm oil, and peanut oil;
   (2) about 47.5 to 49.5 wt% thickening agent selected from the group consisting of 170 g/l of corn starch in water and 1:1 ethoxylated linear alcohol in water; and
   (3) about 47.5 to 49.5 wt% citric acid solution, ranging in concentration from about 3 wt% to saturation of said paste composition.

24. The paste composition of claim 23 further including about 1 to 30 ppm of an odorant selected from the group consisting of wintergreen oil, spearmint oil, and peppermint oil.

25. A method of soldering a metal comprising applying to a surface a soldering paste and heating said metal to a desired soldering temperature, characterized in that said soldering paste comprises:
   (a) at least about 80 wt% particulate solder; and
   (b) the balance a thixotropic flux base having a viscosity of at least about 200,000 cp and comprising
      (1) botanical oil,
      (2) an aqueous emulsion of a thickening agent, and
      (3) a water-soluble organic acid having at least two carboxylic acid groups, said organic acid selected from the group consisting of citric acid, malic acid, tartaric acid, glutamic acid, phthalic acid, and succinic acid.

26. The method of claim 25 wherein said particulate solder has a mesh size ranging from about −325 to +400.

27. The method of claim 26 wherein said particulate solder has a mesh size ranging from about −200 to +325.

28. The method of claim 25 wherein said solder consists essentially of a tin-based solder.

29. The method of claim 28 wherein said solder consists essentially of a tin-lead solder.

30. The method of claim 25 wherein said thixotropic base consists essentially of at least one food thickener in water.

31. The method of claim 30 wherein said thickening agent consists essentially of at least member selected from the group consisting of at least one food thickener and an ethoxylated linear alcohol.

32. The method of claim 31 wherein said food thickener is selected from the group consisting of corn starch, potato starch, lichen, and arrowroot powder.

33. The method of claim 32 wherein said thickening agent consists essentially of 170 g/l of corn starch in water.

34. The method of claim 31 wherein said thickening agent consists essentially of an ethoxylated linear alcohol in water in a ratio of at least about 1:1.

35. The method of claim 27 wherein said botanical oil comprises an oil selected from the group consisting of jojoba oil, palm oil, and peanut oil.

36. The method of claim 27 wherein said organic acid consists essentially of citric acid.

37. The method of claim 25 further including an odorant pleasing to the smell.

38. The method of claim 25, wherein said soldering paste consists essentially of:
   (a) about 80 to 90 wt% of particulate solder having a mesh size ranging from −200 to +325; and
   (b) the balance said thixotropic flux base consisting essentially of
      (1) about 1 to 5 wt% botanical oil selected from the group consisting of jojoba oil, palm oil, and peanut oil,
      (2) about 47.5 to 49.5 wt% thickening agent selected from the group consisting of 170 g/l of corn starch in water and 1:1 ethoxylated linear alcohol in water, and
      (3) about 47.5 to 49.5 wt% citric acid solution, ranging in concentration from about 3 wt% to saturation of said flux base.

39. The paste composition of claim 38 further including about 1 to 30 ppm of an odorant selected from the group consisting of wintergreen oil, spearmint oil, and peppermint oil.

* * * * *